Figure 1:
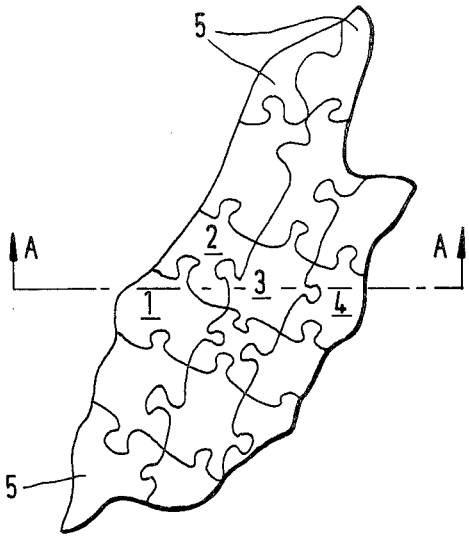
Figure 2:
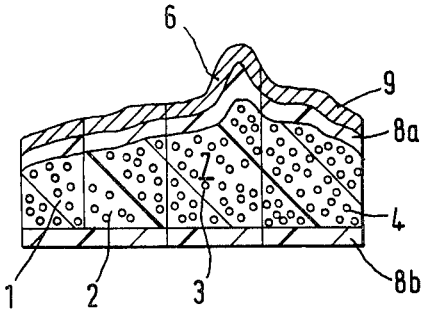
Figure 3:
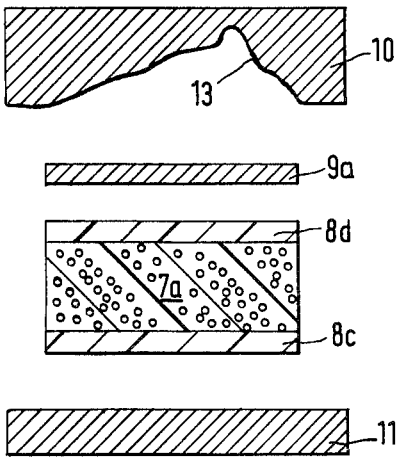
Figure 4:
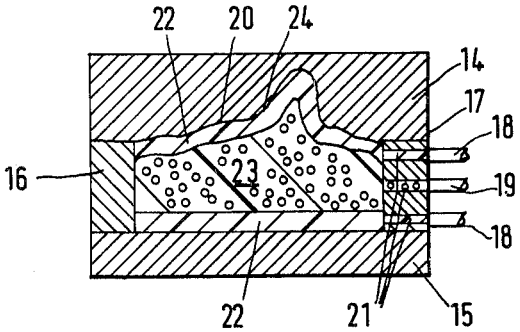

United States Defensive Publication [19] (H) [11] T984,007

Richardson [43] Jul. 3, 1979

[54] JIG-SAW PUZZLES

[75] Inventor: John C. Richardson, Hitchen, England

[73] Assignee: Imperial Chemical Industries Limited, London, England

[21] Appl. No.: 928,293

[22] Filed: Jul. 26, 1978

Related U.S. Application Data

[63] Continuation of Ser. No. 810,372, Jun. 27, 1977, abandoned.

[30] Foreign Application Priority Data

Jul. 9, 1976 [GB] United Kingdom ..... 28677/76

[51] Int. Cl.[2] ..... A63F 9/12

[52] U.S. Cl. ..... 273/157 R; 35/41; 35/42; 156/220; 264/45.1; 264/132; 264/321; 264/DIG. 83

[57] ABSTRACT

A jig-saw puzzle comprises interfitting pieces (1, 2, 3, 4) which when fitted together side-by-side form a three-dimensional upper surface simulating for example hills and valleys. Each piece is formed of a molded open or closed cell thermoplastics foamed core 7 sandwiched between upper and lower thermoplastics skins 8*a* and 8*b*. A printed sheet 9 is stuck on to the upper skin 8*a*. The skins 8*a* and 9*a* may be made from any conventional moldable thermoplastics. A preferred thermoplastics is a copolymer of propylene with from 5 to 20% by weight of ethylene made by injecting ethylene into the final stages of an otherwise propylene homopolymerization. The core may be made of the same or different plastics as the skins. Polyurethane is a preferred core material. The printed sheet, which may be paper or fabric, may be stuck on to the upper sheet with adhesive or by penetration or fusing of the skin material into the sheet during molding of the pieces.

14 Claims, 1 Sheet Drawing
15 Pages Specification

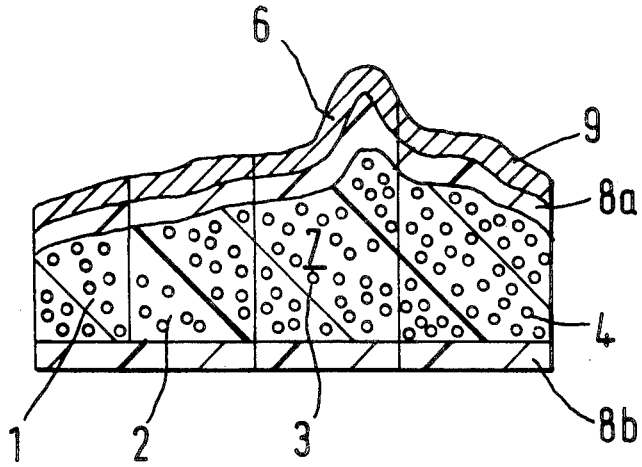

The file of this unexamined application may be inspected and copies thereof may be purchased (849 O.G. 1221, Apr. 9, 1968).